(12) United States Patent
Kim

(10) Patent No.: US 11,816,993 B2
(45) Date of Patent: Nov. 14, 2023

(54) PLATOONING MANAGEMENT DEVICE FOR PROVIDING INTERACTIVE PLATOONING INFORMATION, SERVER FOR MANAGING PLATOONING HISTORY, AND METHOD THEREOF

(71) Applicants: HYUNDAI MOTOR COMPANY, Seoul (KR); KIA MOTORS CORPORATION, Seoul (KR)

(72) Inventor: Dong Hyuk Kim, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 573 days.

(21) Appl. No.: 16/815,373

(22) Filed: Mar. 11, 2020

(65) Prior Publication Data

US 2021/0118307 A1    Apr. 22, 2021

(30) Foreign Application Priority Data

Oct. 22, 2019  (KR) .................. 10-2019-0131613

(51) Int. Cl.
*G08G 1/00* (2006.01)
*G05D 1/00* (2006.01)
(Continued)

(52) U.S. Cl.
CPC ............ *G08G 1/22* (2013.01); *G05D 1/0016* (2013.01); *G05D 1/0022* (2013.01);
(Continued)

(58) Field of Classification Search
CPC . G08G 1/22; H04W 4/46; H04W 4/14; G05D 1/0016; G05D 1/0022; G05D 1/0293; G07C 5/008; G10L 15/26
See application file for complete search history.

(56) References Cited

U.S. PATENT DOCUMENTS 8,032,081 B2   10/2011  Bai et al.
2010/0248618 A1  9/2010  Bai et al.
(Continued)

FOREIGN PATENT DOCUMENTS

| JP | 5074441 B2 | 8/2012 |
| KR | 10-1587955 B1 | 1/2016 |
| WO | 2010/068107 A1 | 6/2010 |

OTHER PUBLICATIONS

Amr Farag, Dynamics Platooning Model and Protocols for Self-Driving Vehicles, 2019, IEEE Intelligent Vehicles Symposium (IV), 1974-1980 (Year: 2019).*
(Continued)

*Primary Examiner* — Elaine Gort
*Assistant Examiner* — Anthony M Gartrelle
(74) *Attorney, Agent, or Firm* — LEMPIA SUMMERFIELD KATZ LLC

(57) ABSTRACT

A platooning management device for providing platooning information, a server for managing a platooning history, and a method thereof are provided. The platooning management device includes: a communicator that performs communication between platooning vehicles, a processor that provides a chat window in which all of platooning members participate, and a display that displays the chat window. The processor determines a platooning state, automatically converts the platooning state into a text, and displays the text on the chat window.

19 Claims, 10 Drawing Sheets

(51) Int. Cl.
*H04W 4/46* (2018.01)
*G07C 5/00* (2006.01)
*H04W 4/14* (2009.01)
*G05D 1/02* (2020.01)
*G10L 15/26* (2006.01)

(52) U.S. Cl.
CPC ........... *G05D 1/0293* (2013.01); *G07C 5/008* (2013.01); *G10L 15/26* (2013.01); *H04W 4/14* (2013.01); *H04W 4/46* (2018.02)

(56) References Cited

U.S. PATENT DOCUMENTS

| | | | | |
|---|---|---|---|---|
| 2014/0316865 | A1* | 10/2014 | Okamoto | G05D 1/0293 |
| | | | | 705/14.1 |
| 2015/0232097 | A1* | 8/2015 | Luther | B60W 30/188 |
| 2016/0180222 | A1* | 6/2016 | Sierhuis | G06N 5/025 |
| 2017/0011633 | A1* | 1/2017 | Boegel | G08G 1/22 |
| 2017/0227972 | A1* | 8/2017 | Sabau | |
| 2017/0293296 | A1* | 10/2017 | Stenneth | G06Q 20/10 |

OTHER PUBLICATIONS

Peng Liu, Distributed Model Predictive Control for Cooperative and Flexible Vehicle Platooning, 2019, IEEE Transactions on Control Systems Technology, vol. 27, No. 3, 1115-1128 (Year: 2019).*

* cited by examiner

LV: THE PLATOON WAS CREATED 10:11 AM

FV1: THE PLATOON DEPARTURE WAS REQUESTED 11:11 AM

LV: THE PLATOON DEPARTURE WAS APPROVED 11:12 AM

FV1: THE PLATOON DEPARTURE WAS COMPLETED 11:14 AM

FV1: THANK YOU. SAFE DRIVING ~ 11:14 AM

LV: THE ROAD ENVIRONMENT IS NOT GOOD.
FOLLOW ME CAREFULLY 11:34 AM

FV2: THE ROAD IS BUMPY 11:34 AM

FV2: BE CAREFUL 11:34 AM

FV3: THE PLATOON DEPARTURE WAS REQUESTED
2:34 PM

LV: THE PLATOON DEPARTURE WAS APPROVED 2:34 PM

FV3: DURING PLATOON DEPATURE
2:36 PM

FV3: THANK YOU
2:36 PM

FIG.5

```
<501>
LV : THE PLATOON
     WAS CREATED

FV1 :

FV2 :

FV3 :

FV4 :
```

```
<502>
LV : THE PLATOON
     DEPARTURE WAS
     APPROVED

FV1 : THE PLATOON
      DEPARTURE WAS
      REQUESTED

FV2 :

FV3 :

FV4 :
```

```
<503>
LV : THE ROAD ENVIRONMENT
     IS NOT GOOD
     FOLLOW ME CAREFULLY

FV1 : BE CAREFUL

FV2 : THE ROAD IS BUMPY

FV3 : THE PLATOON
      DEPARTURE WAS
      REQUESTED
```

```
<504>
LV : THE PLATOON
     DEPARTURE WAS
     APPROVED

FV1 :

FV2 :

FV3 :

FV4 : THE PLATOON
      DEPARTURE WAS
      REQUESTED
```

PLATOONING MANAGEMENT DEVICE FOR PROVIDING INTERACTIVE PLATOONING INFORMATION, SERVER FOR MANAGING PLATOONING HISTORY, AND METHOD THEREOF

CROSS-REFERENCE TO RELATED APPLICATION

This application is claims priority to and the benefit of Korean Patent Application No. 10-2019-0131613, filed on Oct. 22, 2019, the entire contents of which are incorporated herein by reference.

FIELD

The present disclosure relates to a platooning management device for providing interactive platooning information, a server for managing a platooning history, and a method thereof, and more particularly, relates to technologies of providing and monitoring a platooning history in a chat manner.

BACKGROUND

The statements in this section merely provide background information related to the present disclosure and may not constitute prior art.

Platooning is a technology in which a plurality of vehicles perform autonomous driving in the state where they are arranged at a specified interval in line. While the plurality of vehicles are platooning, a leading vehicle which is a vehicle located in the frontline of a platooning line may control one or more following vehicles which follow the leading vehicle. The leading vehicle may maintain an interval between the plurality of vehicles included in the platooning line and may exchange information about behaviors and situations of the plurality of vehicles included in the platooning line using vehicle-to-vehicle (V2V) communication.

An existing technology tracks and transmits state information of a vehicle using communication and manages the vehicle received information of the vehicle.

Herein, due to the nature of platooning, because there are a plurality of users, an integrated communication system is desired. However, a communication method thereof or a monitoring method is not described in detail.

SUMMARY

The present disclosure provides a platooning management device for providing interactive platooning information to deliver a platooning situation and a comment of a user in a group chat manner to collectively communicate between users in a platooning line and manage a platooning history based on interactive data, a server for managing a platooning history, and a method thereof.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a platooning management device may include: a communicator that performs communication between platooning vehicles, a processor that provides a chat window in which all of platooning members participate, and a display that displays the chat window. The processor may determine a platooning state, may automatically converts the platooning state into a text, and may display the text on the chat window.

In one form, the processor may display chat contents input by a user on the chat window.

In another form, the processor may determine the platooning state based on at least one of a platoon input switch signal, a platooning mode signal, a platooning path, a forward vehicle driving condition, or a road and environment condition.

In one form, the processor may receive a voice from a user, may convert the input voice into a text, and may display the text on the chat window.

In one form, the processor may display the text on the chat window in a platoon chat time sequence or based on each platoon chat entity.

In another form, the processor may display platoon chat entities on the chat window in the order of a platooning line.

In other form, the processor may display a text input from a host vehicle and a text input from another vehicle on the chat window to differently distinguish at least one of a color, a size, a thickness, a font, or a display location.

In still other form, the processor may display a text indicating the platooning state and a text of chat contents input by a user on the chat window to differently distinguish at least one of a color, a size, a thickness, a font, or a display location.

According to another aspect of the present disclosure, a server may include: a communicator that communicates with platooning vehicles, a processor that forms platooning states of all the platooning vehicles in a time sequence or for each entity in an interactive manner based on platooning history information received from each of the platooning vehicles, and a storage storing information received via the communicator and platooning member information obtained by the processor. The processor may perform tracking management and accident management based on the platooning state formed in the interactive manner.

In one form, the processor may form the platooning states of all of the platooning vehicles in the interactive manner using a text message received from each of the platooning vehicles.

In another form, the communicator may receive at least one of a text message, platooning location information, a driving road condition, or a driving environment condition from the platooning vehicles.

In other form, the processor may assign a rating for each of the platooning vehicles based on an achievement ratio of a driving distance to a predetermined target distance when the platooning vehicles depart from a platooning line and whether there is a risk avoidance situation during platooning and stores and manages the rating.

According to another aspect of the present disclosure, a platooning management method may include: determining, by a processor, a platooning state and automatically converting the platooning state into a text; receiving, by the processor, a platoon chat from a user; and displaying, by a display, platoon chat contents received from platooning vehicles, the automatically converted text indicating the platooning state, and a platoon chat input from the user on a chat window in which all of platooning members participate.

In one form, the automatically converting of the platooning state into the text may include: determining the platooning state based on at least one of a platoon input switch signal, a platooning mode signal, a platooning path, a forward vehicle driving condition, or a road and environment condition.

In another form, the receiving of the platoon chat from the user may include receiving a text or converting a voice input from the user into a text.

In other form, the displaying on the chat window may include: displaying the text on the chat window in a platoon chat time sequence or based on a platoon chat entity.

In other form, the displaying on the chat window may include displaying platoon chat entities on the chat window in the order of a platooning line.

In one form, the displaying on the chat window may include: displaying a text input from a host vehicle and a text input from another vehicle on the chat window to differently distinguish at least one of a color, a size, a thickness, a font, or a display location.

In another form, the displaying on the chat window may include: displaying a text indicating the platooning state and a text of chat contents input by the user on the chat window to differently distinguish at least one of a color, a size, a thickness, a font, and a display location.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 5 is a drawing illustrating an exemplary screen of a platoon chat based on a time sequence;

FIG. 6 is a drawing illustrating exemplary screens of a platoon chat based on a platoon entity;

Figure 1:
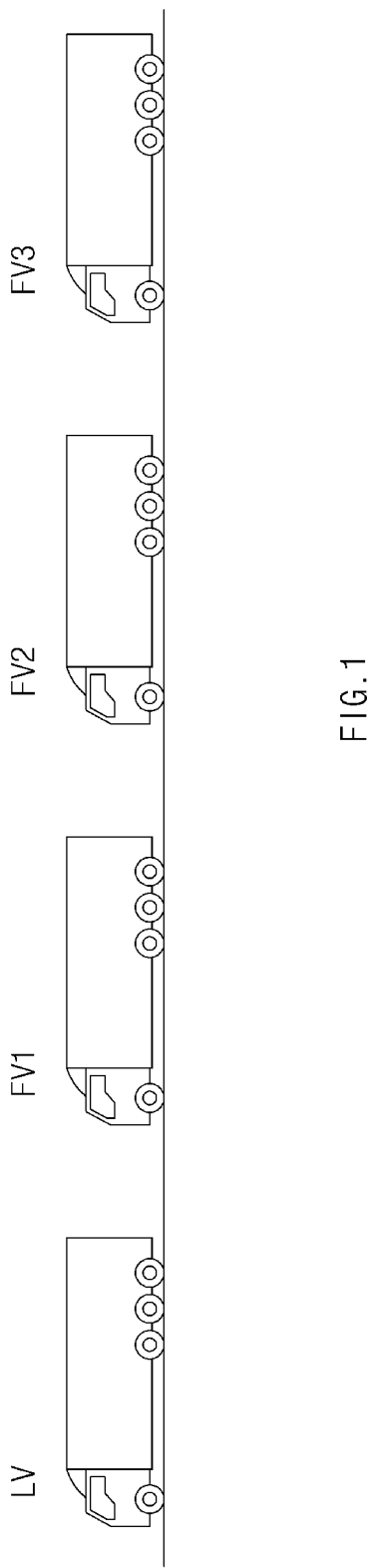
FIG. 1 is a drawing illustrating a platooning environment.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some forms of the present disclosure will be described in detail with reference to the exemplary drawings. In adding the reference numerals to the components of each drawing, it should be noted that the identical or equivalent component is designated by the identical numeral even when they are displayed on other drawings. Further, in describing the form of the present disclosure, a detailed description of well-known features or functions will be ruled out in order not to unnecessarily obscure the gist of the present disclosure.

In describing the components of the form according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, a description will be given in detail of forms of the present disclosure with reference to FIGS. 1 and 10.

FIG. 1 is a drawing illustrating a platooning environment according to one form of the present disclosure.

A leading vehicle LV and following vehicles FV1, FV2, and FV3, which are included in a platooning group, may perform platooning on the road. The leading vehicle LV and the following vehicles FV1, FV2, and FV3 may travel while maintaining a specified distance. While the leading vehicle LV and the following vehicles FV1, FV2, and FV3 are traveling, the leading vehicle LV or the following vehicles FV1, FV2, and FV3 may adjust a distance between the leading vehicle LV and the following vehicle FV1, a distance between the following vehicle FV1 and the following vehicle FV2, and a distance between the following vehicle FV2 and the following vehicle FV3 and may increase or decrease an inter-vehicle distance depending on manipulation of a user. Furthermore, the leading vehicle LV or the following vehicles FV1, FV2, and FV3 may depart from a platooning line, may approve the departure, or may join the platooning line depending on manipulation of the user.

Figure 2:
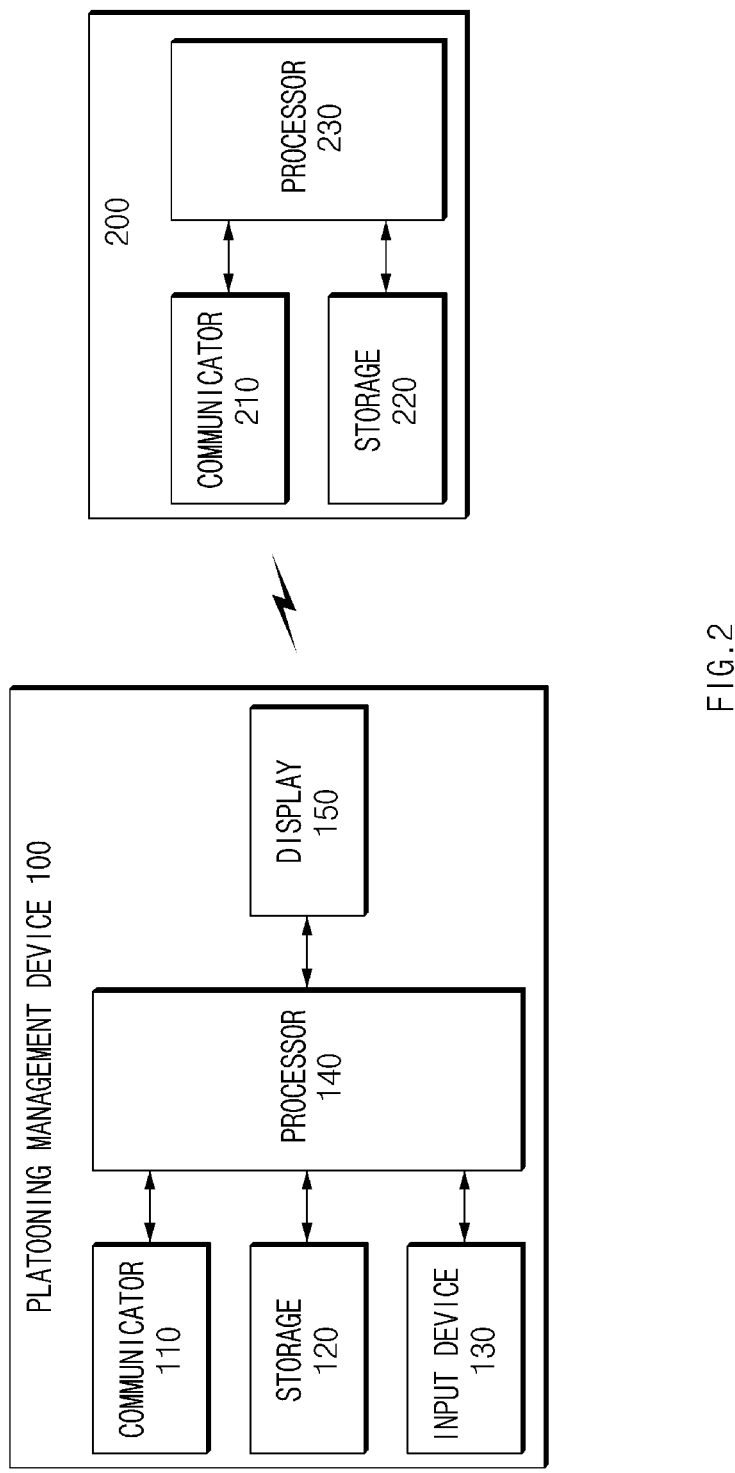
FIG. 2 is a block diagram illustrating a configuration of a vehicle system including a platooning management device.
Figure 3:
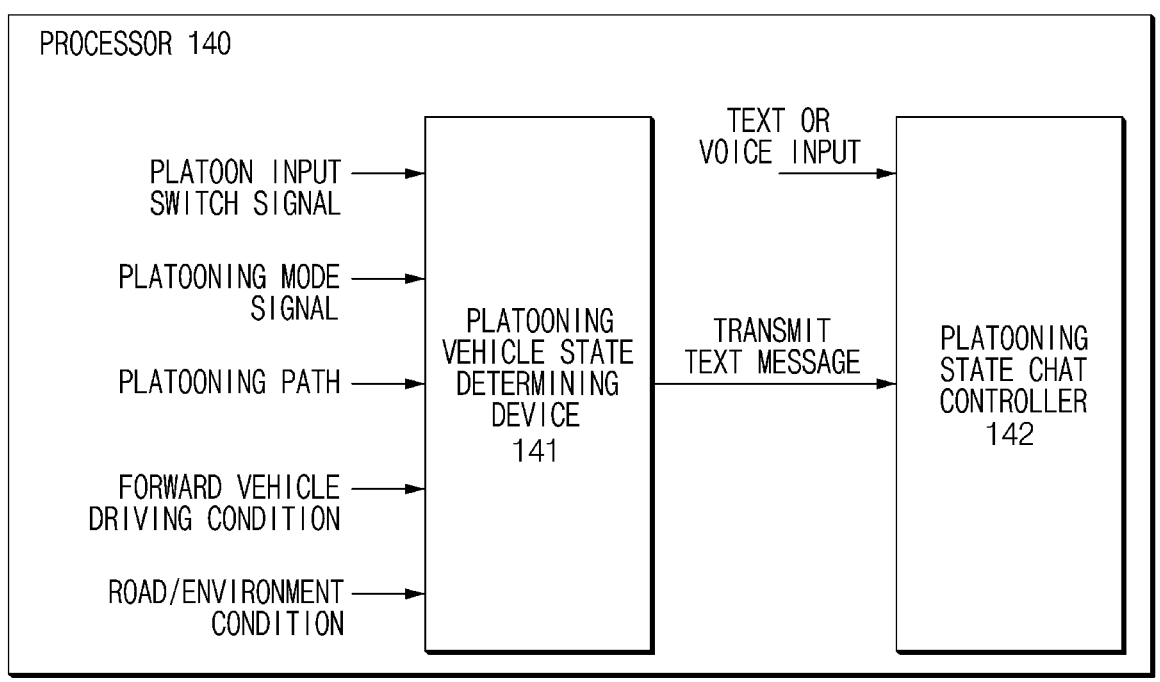
FIG. 3 is a block diagram illustrating a detailed configuration of a processor of FIG. 2.
Figure 4:
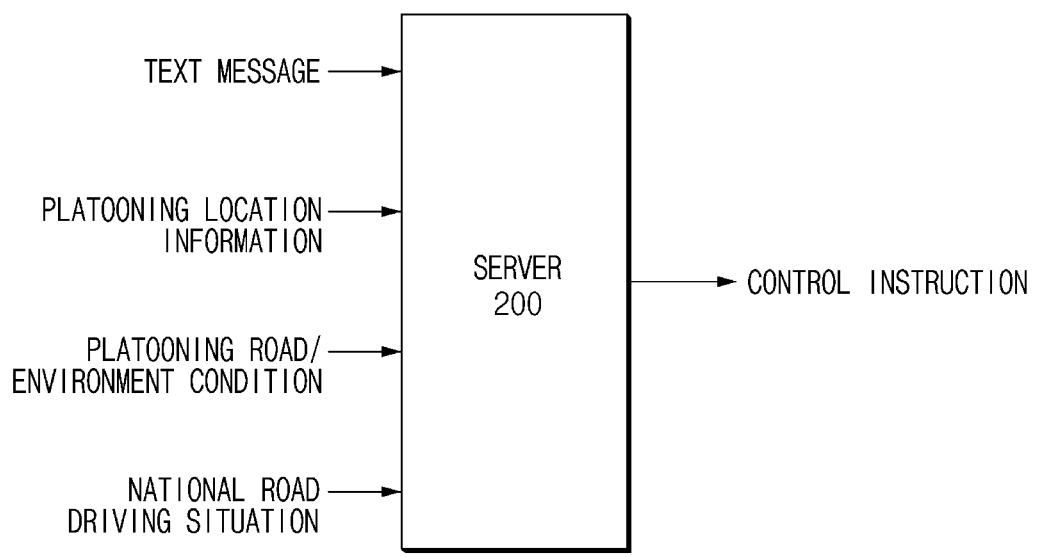
FIG. 4 is a drawing illustrating input and output flow of a signal for describing an operation of a server of FIG. 2.

FIG. 2 is a block diagram illustrating a configuration of a vehicle system including a platooning management device according to one form of the present disclosure. FIG. 3 is a block diagram illustrating a detailed configuration of a processor of FIG. 2. FIG. 4 is a drawing illustrating input and output flow of a signal for describing an operation of a server of FIG. 2.

Referring to FIG. 2, the system according to one form of the present disclosure may include a platooning management device 100 and a server 200.

The platooning management device 100 may provide a chat window, in which all of platooning members participate, for sharing a platooning state between platooning vehicles and communicating between the platooning members to determine the platooning state, may automatically convert the platooning state into a text to display the text on the chat window, and may display chat contents entered by a user on the chat window.

The platooning management device 100 may include a communicator 110, a storage 120, an input device 130, a processor 140, and a display 150.

The communicator 110 may be a hardware device implemented with various electronic circuits to transmit and receive a signal through a wireless or wired connection. In one form of the present disclosure, the communicator 110 may perform inter-vehicle communication through controller area network (CAN) communication, local interconnect network (LIN) communication, Ethernet communication, or the like and may perform vehicle-to-vehicle (V2V) communication with platooning vehicles outside a host vehicle. The communicator 110 may include various communication units, for example, a mobile communication unit, a broadcast receiving unit, such as a digital multimedia broadcasting (DMB) module or a digital video broadcasting-handheld (DVB-H) module, a short-range communication unit, such as a ZigBee module or a near field communication (NFC) module which is a Bluetooth module, and a wireless-fidelity (Wi-Fi) unit. In one form, the communicator 110 may transmit and receive a text message generated between platooning vehicles and may receive all platoon chat contents from a leading vehicle or may receive command contents from the server 200.

The storage 120 may store a sensing result of a sensing device, interactive platooning information, chat contents obtained by the processor 140, or the like. The storage 120 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

The display 150 may be controlled by the processor 140 to display chat contents during platooning. The display 150 may be implemented as a head-up display (HUD), a cluster, an audio video navigation (AVN), a human machine interface (HMI), or the like. Furthermore, the display 150 may include at least one of a liquid crystal display (LCD), a thin film transistor-LCD (TFT-LCD), a light emitting diode (LED) display, an organic LED (OLED) display, an active matrix OLED (AMOLED) display, a flexible display, a bended display, or a three-dimensional (3D) display. Some thereof may be implemented as transparent displays configured as a transparent type or a semi-transparent type to see the outside. Moreover, the display 150 may be implemented as a touchscreen including a touch panel to be used as an input device other than a output device.

The input device 130 may include a platooning switch, a microphone for receiving a voice of a user, a keyboard for receiving text from the user, a touch screen, or the like. The input device 130 may receive a platoon approval request, a platoon departure request, a line adjustment request, or the like through the platooning switch. The input device 130 may deliver a voice of the user, input via the microphone, to the processor 140. The processor 140 may recognize the voice and may convert the recognized voice into text.

The processor 140 may be electrically connected with the communicator 110, the storage 120, the input device 130, the display 150, or the like and may electrically control the respective components. The processor 140 may be an electrical circuit which executes instructions of software and may perform a variety of data processing and calculation described below.

The processor 140 may provide a chat window, in which all of platooning members participate, for sharing a platooning state between platooning vehicles and communicating between the platooning members. Furthermore, the processor 140 may determine a platooning state, may automatically convert the platooning state into text to display the text on a chat window, and may display chat contents input by a user on the chat window.

The processor 140 may determine the platooning state based on at least one of a platoon input switch signal, a platooning mode signal, a platooning path, a forward vehicle driving condition, or a road and environment condition.

The processor 140 may receive a voice from the user, may recognize the received voice to convert the recognized voice into a text, and may display the text on a chat window.

The processor 140 may display text on the chat window in a platoon chat time sequence or based on each platoon chat entity and may display platoon chat entities in the order they are included in a platooning line on the chat window to guarantee platooning members anonymity.

The processor 140 may display a text input from a host vehicle and a text input from another vehicle on the chat window to differently distinguish at least one of a color, a size, a thickness, a font, or a display location.

Furthermore, the processor 140 may display text indicating a platooning state and text of chat contents input by the user on the chat window to differently distinguish at least one of a color, a size, a thickness, a font, or a display location.

The sensing device may include a plurality of sensors for sensing a clearance from a preceding vehicle during platooning, a relative speed with the preceding vehicle, a relative speed with the preceding vehicle, a movement direction of the leading vehicle, and an obstacle outside a host vehicle, and may further include an ultrasonic sensor, a radar, a camera, a laser scanner and/or a corner radar, a light detection and ranging (LiDAR), an acceleration sensor, a yaw rate sensor, a torque sensor and/or a wheel speed sensor, a steering angle sensor, or the like.

The server 200 may form platooning states of all of platooning vehicles for each time or entity in an interactive manner based on platooning history information received from the platooning vehicles and may perform tracking management and accident management based on the platooning states formed in the interactive manner. In other words, the server 200 may store a text message generated between platooning vehicles, may manage platooning history information, and may assign and manage a rating for each vehicle or user who participates in platooning. Furthermore, the server 200 may transmit command contents (e.g., a change in final destination, stop addition, a change in route, or the like) for platooning vehicles in the form of a text message and may anonymize and display persons who participate in platooning.

To this end, the server 200 may include a communicator 210, a storage 220, and a processor 230.

The communicator 210 may perform V2V communication with platooning vehicles and may receive at least one or more of interactive platooning history information, platooning location information, a driving road condition, and/or a driving environment condition from the platooning vehicles.

The storage 220 may store information such as a platoon chat history text message, a platooning location, and/or a driving road and environment condition, received from the platooning vehicles, and may store a rating for each platooning member, obtained by the processor 230.

The processor 230 may cluster a platooning history and may store the clustered information in the storage 220.

The processor 230 may form platooning states of all the platooning vehicles for each time or entity in an interactive manner based on platooning history information received from the platooning vehicles and may form the platooning states of all the platooning vehicles in an interactive manner using a text message received from each of the platooning vehicles.

When an accident occurs during platooning, the processor 230 may analyze the cause of the accident, may perform tracking management, and may provide the cause of the accident.

The processor 230 may share a platooning history with all the platooning vehicles such that the platooning history is distributed and stored in the platooning vehicles.

The processor 230 may assign a rating for each platooning vehicle based on the achievement ratio of a driving distance to a predetermined target distance when platooning vehicles depart from a platooning line and whether there is a risk avoidance situation during platooning and may store and manage the rating in the storage 220.

Referring to FIG. 3, a platooning vehicle state determining device 141 may determine a platooning vehicle state based on a platoon input switch signal, a platooning mode signal, a platooning path, a forward vehicle driving condition, and a road/environment condition, may convert the platooning vehicle state into text, and may transmit the text to a platooning state chat controller 142. In this case, the platoon input switch signal may include a platoon approval request, a platoon departure request, a line adjustment request, or the like. The platooning mode signal may include platoon creation, platoon release, during platoon departure, during platooning line adjustment, during platoon creation, temporary platoon release, or the like. The platooning path may include lane change prediction, acceleration prediction, deceleration prediction, a driving path change, or the like. The forward vehicle driving condition may include road congestion, surrounding obstacle detection, stop vehicle caution, road construction ahead, road work ahead, or the like. The road/environment condition may include a weather condition (e.g., fog, rain, snow, or the like), a road pavement state, or the like.

The platooning state chat controller 142 may display and provide text received from the platooning vehicle state determining device 141 and text directly entered by a user on a chat window. When receiving a voice from the user, the platooning state chat controller 142 may recognize the voice and may convert and use the recognized voice into a text.

In this case, the platooning state chat controller 142 may display the text based on a time sequence or a platoon entity. Alternatively, the platooning state chat controller 142 may anonymize a text input entity, for example, display chat names of the entities in the order they are included in a platooning line to strengthen security for personal information.

Referring to FIG. 4, the server 200 may receive an interactive text message, platooning location information, platooning road/environment condition, a national road driving situation, or the like from platooning vehicles, may cluster the platooning situations, and may store and manage the clustered information. Furthermore, when an accident occurs during platooning, the server 200 may analyze the stored platooning history, may determine the cause of the accident, and may perform an accident black box function.

Furthermore, the server 200 may compare the national road driving situation with the platooning location, may provide a control instruction based on related contents, and may distribute and transmit a platooning history to all vehicles which participate in platooning, such that all the vehicles store the platooning history, to strengthen security.

FIG. 5 is a drawing illustrating an exemplary screen of a platoon chat based on a time sequence according to one form of the present disclosure.

Referring to FIG. 5, a platoon chat may be listed up in a time sequence and a screen shown in FIG. 5 may be displayed on displays of all vehicles in a platooning line to establish a chat. Referring to FIG. 5, text input from a host vehicle and text input from another vehicle may be displayed to differently distinguish a thickness, a font, a color, a display location, or the like. The processor may display a text matched with each of the plurality of platooning members in the chat window.

Furthermore, as platooning members may be anonymized as LV, FV1, and FV2 on a chat window of FIG. 5, the exemplary form of the present disclosure may increase personal security.

FIG. 6 is a drawing illustrating an exemplary screen of a platoon chat based on a time sequence according to another form of the present disclosure.

Referring to reference numeral 501 of FIG. 6, platooning members may be displayed in the order they are included in a platooning line and chat contents input for each platooning member may be displayed. In this case, a color, a font, a size, a thickness, a display location, and the like of text of a host vehicle FV2 may be differently displayed to be distinguished from text of another vehicle in platooning line.

In reference numeral 501, an example in which a leading vehicle LV provides a notification that the platoon has been created is shown. In reference 502, an example of displaying chat contents in an interactive manner when a following vehicle FV1 requests platooning departure is shown.

In reference numeral 503, it may be seen that a following vehicle FV3 which is platooning requests platoon departure, that the text "The road environment is not good. Follow me carefully", input by a user of the leading vehicle LV, is displayed, and that the text "Be careful", input by a user of the following vehicle FV1, is displayed in response to the text.

Hereinafter, in reference numeral 504, an example of displaying that the leading vehicle LV approves platoon departure with respect to the platoon departure request of the following vehicle FV3 is shown. In reference numeral 505, an example in which the following vehicle FV3 departs from a platooning line and is not displayed on the chat room is shown.

In this case, to distinguish platoon related text for displaying information about a change (e.g., platoon creation, departure, approval, or the like) in platooning situation from general text which is chat contents input with voices or text by each of users of vehicles which are platooning, the platoon related text and the general text may be displayed to differently distinguish a color, a font, a size, a thickness, a display location, or the like of the text. Furthermore, a platooning management device 100 of FIG. 2 may automatically delete chat contents after a predetermined time elapses. When there is a change in location in a platooning line, the platooning management device 100 may reflect and display the change in real time. For example, when a leading vehicle changes to a second following vehicle due to a problem such as breakdown or fuel efficiency, the platooning management device 100 may quickly determine and reflect such a platooning situation.

The chat contents shown in FIGS. 5 and 6 may be generated based on text into which a voice of each of users of vehicles which are platooning is converted, text directly entered by the user, or text into which a platooning state determined by the platooning management device 100 is converted.

A server 200 of FIG. 2 may store the chat contents shown in FIGS. 5 and 6 to determine an accident history which occurs during platooning, based on the previously stored chat contents when an accident occurs, thus performing tracking management in the future, and to easily analyze the cause of an accident when the accident occurs, thus functioning as a black box.

Figure 7:
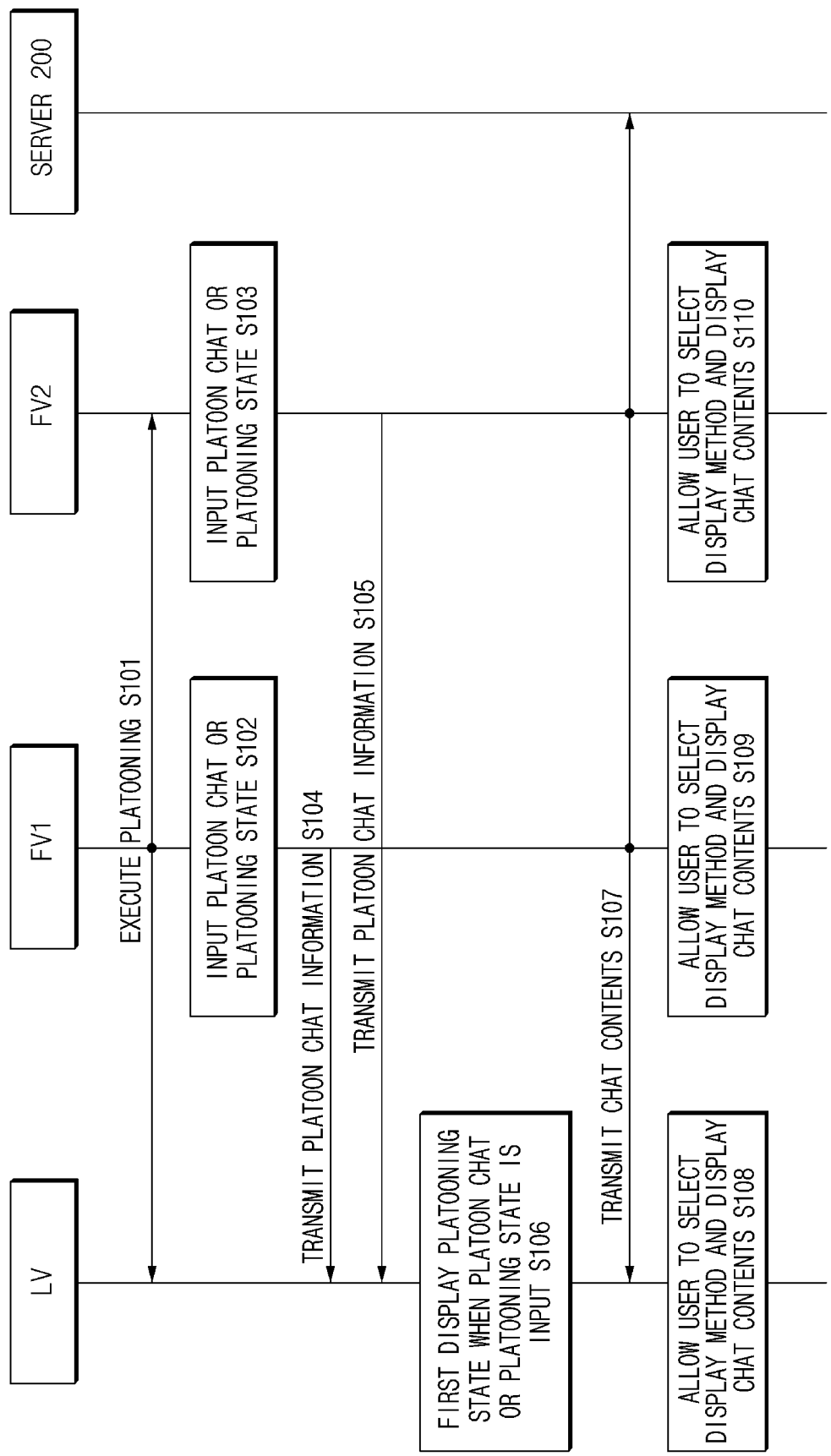
FIG. 7 is a signal sequence diagram illustrating a method for displaying a chat manner in a platooning management device.

Hereinafter, a description will be given in detail of a method for displaying a chat manner in a platooning management device according to one form of the present disclosure. FIG. 7 is a signal sequence diagram illustrating a method for displaying a chat manner in a platooning management device according to one form of the present disclosure.

Hereinafter, it is assumed that a platooning management device 100 loaded into each of a leading vehicle LV and following vehicles FV1 and FV2 performs a process of FIG. 7.

First of all, as platooning of the leading vehicle LV and the following vehicles FV1 and FV2 is executed, while the leading vehicle LV and the following vehicles FV1 and FV2 are platooning in S101, when a platoon chat or a platooning state is input in S102 and S103, in S104 and S105, each of the following vehicles FV1 and FV2 may transmit the platoon chat (text) to the leading vehicle LV.

In S106, the leading vehicle LV may first display a platooning state when its platoon chat or its platooning state is input. In S107, the leading vehicle LV may transmit its platoon chat information and platoon chat information received from the following vehicles FV1 and FV2 to the following vehicles FV1 and FV2.

In S108, S109, and S110, each of the leading vehicle LV and the following vehicles FV1 and FV2 may fuse and display chat contents of the leading vehicle LV and the following vehicles FV1 and FV2 depending on a display method set by a user. In this case, the display method may include a method for displaying text in a time sequence or for each platoon entity.

In FIG. 7, one form is exemplified as the leading vehicle LV collects platoon chat information indicating a platooning state from the following vehicles FV1 and FV2 and shares the platoon chat information with the following vehicles FV1 and FV2. However, forms are not limited thereto. For example, the server 200 may be implemented to collect platooning history information of the leading vehicle LV and the following vehicles FV1 and FV2, form a platooning state in an interactive manner, and provide the platooning state formed in the interactive manner to the leading vehicle LV and the following vehicles FV1 and FV2. Furthermore, the leading vehicle LV may be implemented to collect platooning history information from following vehicles FV1 and FV2, form a platooning state in an interactive manner, and provide the platooning state formed in the interactive manner to the following vehicles FV1 and FV2.

Figure 8:
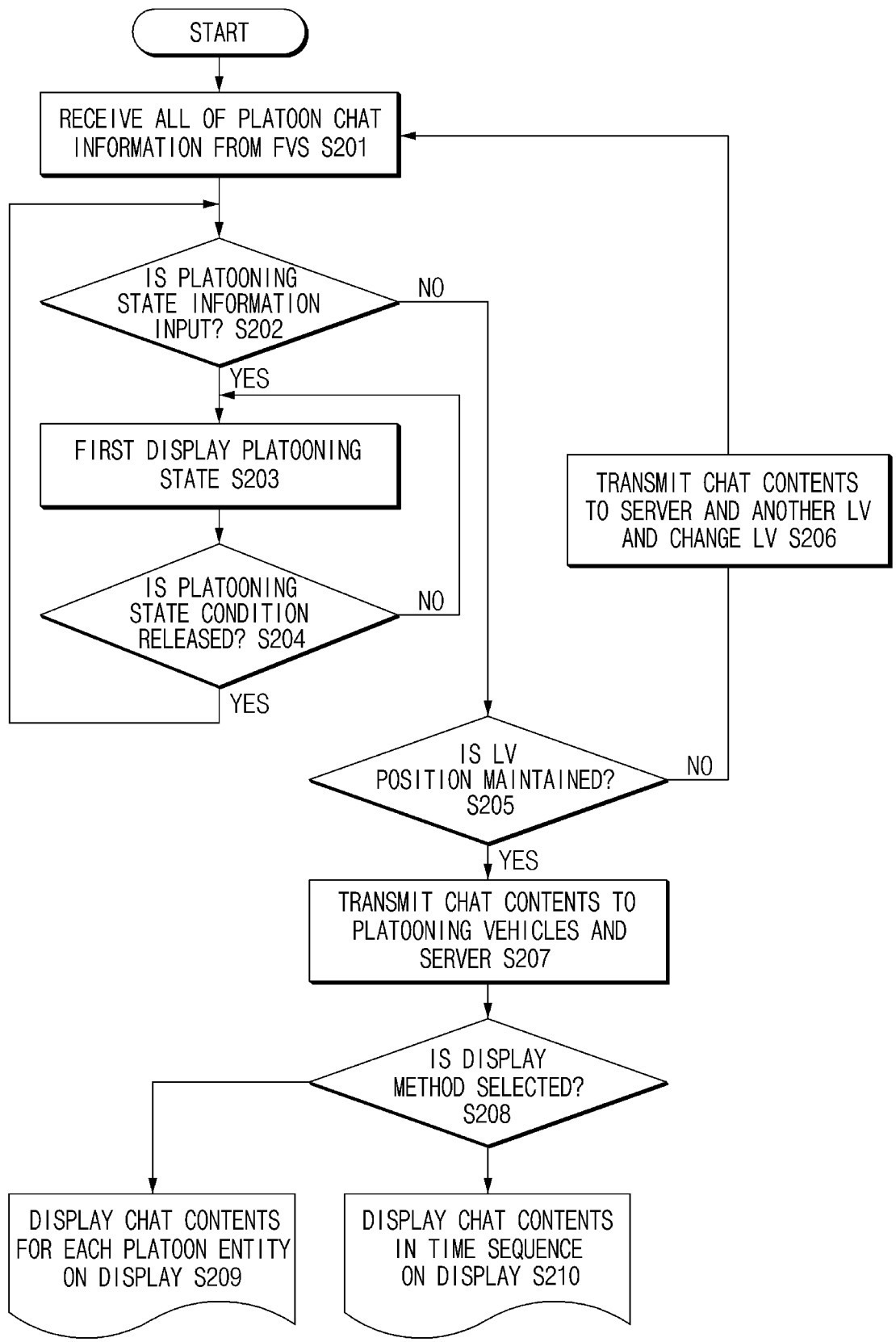
FIG. 8 is a flowchart illustrating a method for displaying a chat manner of a leading vehicle.

Hereinafter, a description will be given in detail of a method for displaying a chat manner of a leading vehicle according to another form of the present disclosure. FIG. 8 is a flowchart illustrating a method for displaying a chat manner of a leading vehicle according to another form of the present disclosure.

Hereinafter, it is assumed that a platooning management device 100 of FIG. 2 performs a process of FIG. 8. Furthermore, in a description of FIG. 8, an operation described as being performed by an apparatus may be understood as being controlled by a processor 140 of the platooning management device 100 of a leading vehicle LV.

In S201, the apparatus of the leading vehicle LV may receive all platoon chat information from following vehicles. In S202, the apparatus of the leading vehicle LV may determine whether its platooning state information is input. When the platooning state information is input, in S203, the apparatus of the leading vehicle LV may first display a platooning state on a chat window.

In S204, the apparatus of the leading vehicle LV may check whether a platooning state condition is released. When the platooning state condition is released, the apparatus of the leading vehicle LV may repeat S202, S203, and S204.

When the platooning state information is not input, in S205, the apparatus of the leading vehicle LV may determine whether the leading vehicle LV maintains a leading vehicle position at a current time.

When the leading vehicle LV does not maintain the leading vehicle position, in S206, the apparatus of the leading vehicle LV may transmit chat contents to the server 200 and a vehicle selected as a new leading vehicle and may hand over a leading position to the vehicle. In this case, handing over the leading position may refer to moving from a location of the leading vehicle to a location of a following vehicle position.

When the leading vehicle LV maintains the leading vehicle position, in S207, the apparatus of the leading vehicle LV may transmit chat contents to all vehicles which are platooning and the server 200.

In S208, the apparatus of the leading vehicle LV may allow a user to select a display method. In S209 and S210, the apparatus of the leading vehicle LV may display chat contents depending on a display method selected by the user (for each platoon entity or in a time sequence).

Figure 9:
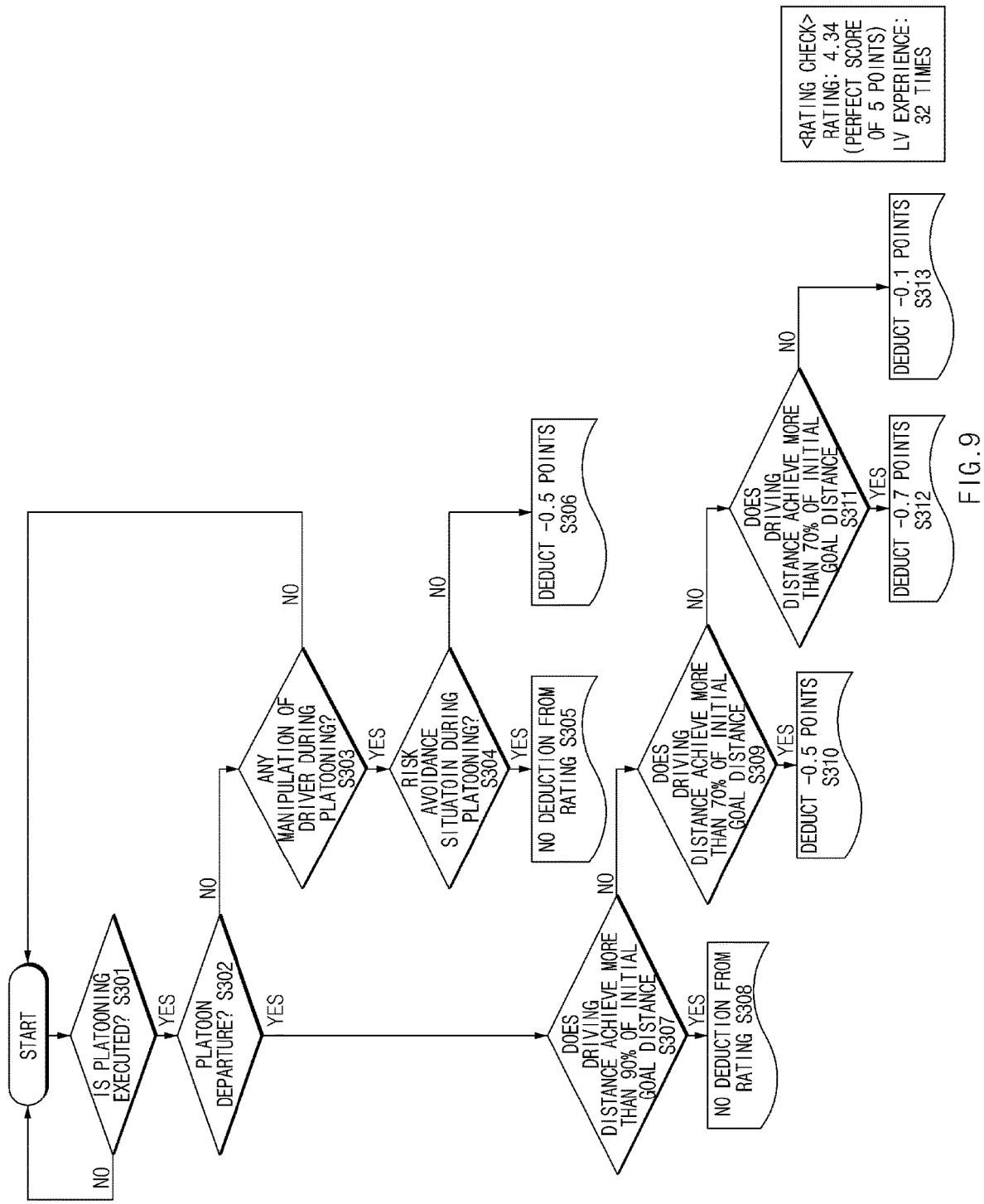
FIG. 9 is a flowchart illustrating a method for managing a rating of a platooning user in a server.

A description will be given in detail of a method for managing a rating of a platooning user in a server according to another form of the present disclosure with reference to FIG. 9. FIG. 9 is a flowchart illustrating a method for managing a rating of a platooning user in a server according to another form of the present disclosure. Hereinafter, it is assumed that a processor 230 of a server 200 of FIG. 2 performs a process of FIG. 9. One form is exemplified as the processor 230 of the server 200 determines a deduction situation of each vehicle and determines a final rating, assuming that the perfect score of rating is 5 points.

After platooning is executed in S301, in S302, the server 200 may determine whether a vehicle departs from a platooning line, based on stored interactive platooning history information.

When the vehicle departs from the platooning line while the platooning is executed, in S307, the server 200 may determine whether a driving distance of the vehicle which departs from the platooning line achieves more than 90% of an initial target distance. When the driving distance of the vehicle achieves more than 90% of the initial target distance, in S308, the server 200 may assign the perfect score without rating deduction.

Meanwhile, when the driving distance of the vehicle which departs from the platooning line achieves less than 90%, in S309, the server 200 may determine whether the driving distance of the vehicle achieves more than 70% of the initial target distance. When the driving distance of the vehicle achieves more than 70% of the initial target distance, in S310, the server 200 may deduct −0.5 points.

On the other hand, when the driving distance of the vehicle which departs from the platooning line achieves less than 70% of the initial target distance, in S311, the server 200 may determine whether the driving distance of the vehicle achieves more than 50% of the initial target distance. When the driving distance of the vehicle achieves more than 50% of the initial target distance, in S312, the server 200 may deduct −0.7 points. When the driving distance of the vehicle achieves less than 50% of the initial target distance, in S313, the server 200 may deduct −1.0 point.

Meanwhile, when there is no vehicle which departs from the platooning line among vehicles which are platooning in S302, in S303, the server 200 may determine whether any manipulation of a user occurs during platooning, based on interactive platoon history information.

When any manipulation of the user does not occur, the server 200 may return to the initial step. When any manipulation of the user occurs, in S304, the server 200 may determine whether there is a risk avoidance situation during platooning, based on the interactive platoon history information.

When there is the risk avoidance situation during the platooning, in S305, the server 200 may process the rating without deduction. When there is no risk avoidance situation during the platooning, in S306, the server 200 may deduct −0.5 points.

As such, the server 200 may analyze an achievement ratio of the initial target distance, a risk avoidance situation during platooning, and the like based on the interactive platooning history information and may assign and manage a rating of a platooning vehicle.

Achievement ratios (e.g., 90%, 70%, and 50%) of the initial target distance of FIG. 9 and deduction points (e.g., −0.5, −0.7, and −1) are merely illustrative, but not limited thereto. An achievement ratio and a deduction score may be adjusted depending on situations.

As such, one form of the present disclosure may automatically input text depending on a behavior of a vehicle and a platooning state although a user directly enters chat text, thus easily transmitting information and easily communicating between members. Furthermore, in one form of the present disclosure, the server may collectively manage an accident history which occurs during platooning to perform tracking management in the future, may easily determine the cause of an accident using a platooning history, may play a role as a black box between platooning vehicles, and may manage and display ratings of persons which participate in platooning to proceed with continuous and stable platooning. Moreover, one form of the present disclosure may anonymize persons who participate in platooning upon a chat to strengthen security of the persons who participate in platooning.

Figure 10:
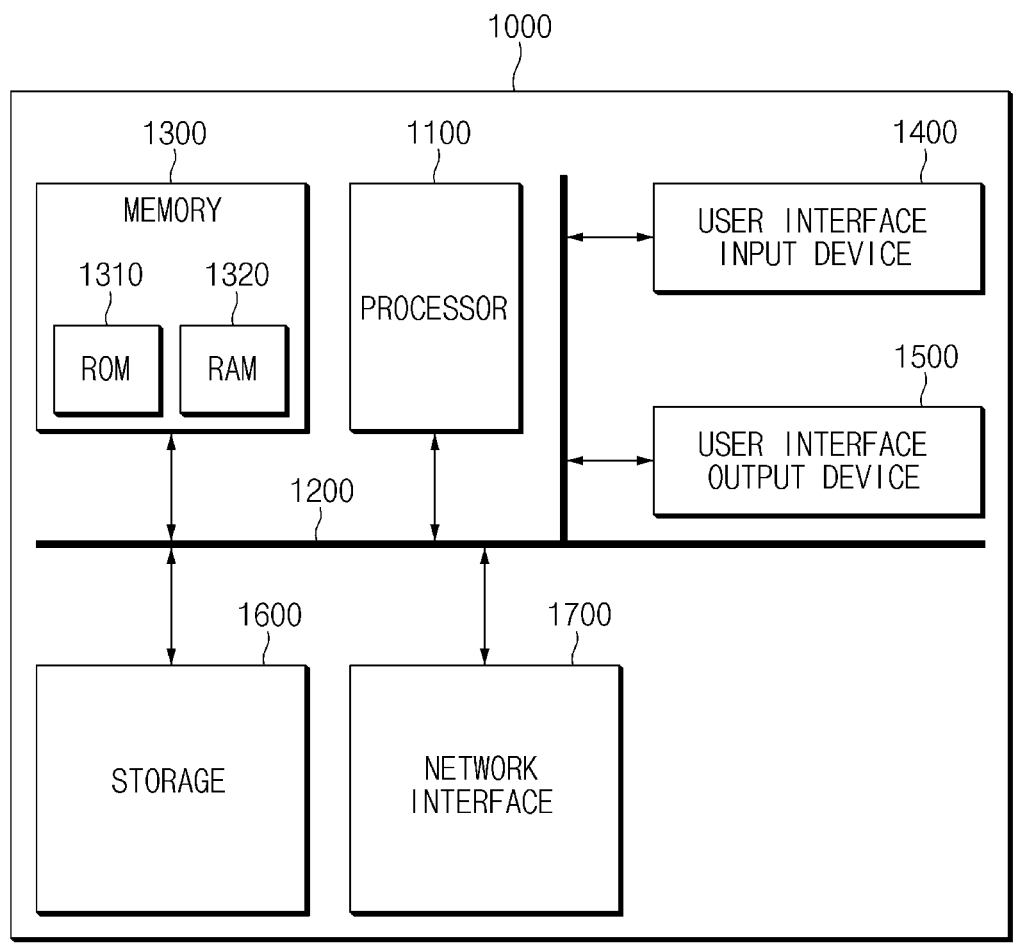
FIG. 10 is a block diagram illustrating a computing system.

FIG. 10 is a block diagram illustrating a computing system according to one form of the present disclosure.

Referring to FIG. 10, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the forms disclosed herein may be embodied directly in hardware or a software module executed by the processor 1100, or in a combination thereof. The software module may reside on a storage medium (that is, the memory 1300 and/or the storage 1600) such as a RAM memory, a flash memory, a ROM memory, an EPROM memory, an EEPROM memory, a register, a hard disk, a removable disk, and a CD-ROM.

The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

The present technology may provide interactive platooning information to deliver a platooning situation and a comment of the user in a group chat manner to collectively communicate between users in a platooning line and manage a platooning history based on interactive data.

In addition, various effects directly or indirectly ascertained through the present disclosure may be provided.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary forms of the present disclosure are provided to explain the spirit and scope of the present disclosure, but not to limit them, so that the spirit and scope of the present disclosure is not limited by the forms. The scope of the present disclosure should be construed on the basis of the accompanying claims, and all the technical ideas within the scope equivalent to the claims should be included in the scope of the present disclosure.

What is claimed is:

1. A platooning management device, comprising:
a communicator configured to communicate between platooning vehicles;
a processor configured to provide a chat window in which all of platooning members participate; and
a display configured to display the chat window,
wherein the processor is configured to:
    determine a platooning state;
    automatically convert the platooning state into a text;
    display the text on the chat window;
    display interactive data of each of a plurality of platooning members in the chat window in text form; and
    display a text matched with each of the plurality of platooning members in the chat window,
wherein:
the platooning vehicles include a leading vehicle and a following vehicle, and
when the following vehicle requests the leading vehicle to depart from a platooning line, the leading vehicle approves departure of the following vehicle from the platooning line,
wherein the processor is further configured:
    not to display the following vehicle in the chat window when the following vehicle departs the platooning line; and to modify and display positions of remaining platooning vehicles changed due to the following vehicle departing the platooning line.

2. The platooning management device of claim 1, wherein the processor is configured to display chat contents input by a user on the chat window.

3. The platooning management device of claim 1, wherein the processor is configured to determine the platooning state based on at least one of a platoon input switch signal, a platooning mode signal, a platooning path, a forward vehicle driving condition, or a road and environment condition.

4. The platooning management device of claim 1, wherein the processor is configured to: receive a voice from a user, convert the voice into a text, and display the text on the chat window.

5. The platooning management device of claim 1, wherein the processor is configured to: display the text on the chat window in a platoon chat time sequence or based on each platoon chat entity.

6. The platooning management device of claim 1, wherein the processor is configured to display platoon chat entities on the chat window in the order of a platooning line.

7. The platooning management device of claim 1, wherein the processor is configured to display a text input from a host vehicle and a text input from another vehicle on the chat window to differently distinguish at least one of a color, a size, a thickness, a font, or a display location.

8. The platooning management device of claim 1, wherein the processor is configured to display a text indicating the platooning state and a text of chat contents input by a user on the chat window to differently distinguish at least one of a color, a size, a thickness, a font, or a display location.

9. A server, comprising:
a communicator configured to communicate with platooning vehicles;
a processor configured to form platooning states of all of the platooning vehicles in a time sequence or for each entity in an interactive manner based on platooning history information received from each of the platooning vehicles; and
a storage configured to store information received via the communicator and platooning member information obtained by the processor,
wherein the processor is configured to:
perform tracking management and accident management based on a platooning state formed in the interactive manner;
display interactive data of each of a plurality of platooning members in a chat window in text form; and
display a text matched with each of the plurality of platooning members in the chat window,
wherein:
the platooning vehicles include a leading vehicle and a following vehicle, and
when the following vehicle requests the leading vehicle to depart from a platooning line, the leading vehicle approves departure of the following vehicle from the platooning line, and
wherein the processor is further configured:
not to display the following vehicle in a chat window displayed in the platooning vehicles when the following vehicle departs the platooning line; and
to modify and display positions of remaining platooning vehicles changed due to the following vehicle departing the platooning line.

10. The server of claim 9, wherein the processor is configured to form platooning states of all of the platooning vehicles in the interactive manner using a text message received from each of the platooning vehicles.

11. The server of claim 9, wherein the communicator is configured to receive at least one of a text message, platooning location information, a driving road condition, or a driving environment condition from the platooning vehicles.

12. The server of claim 9, wherein the processor is configured to: assign a rating for each of the platooning vehicles based on an achievement ratio of a driving distance to a predetermined target distance when the platooning vehicles depart from a platooning line and whether there is a risk avoidance situation during platooning, and store and manage the rating.

13. A platooning management method, comprising:
determining, by a processor, a platooning state and automatically converting the platooning state into a text;
receiving, by the processor, a platoon chat from a user;
displaying, by a display, platoon chat contents received from platooning vehicles, the automatically converted text indicating the platooning state, and a platoon chat input from the user on a chat window in which all of platooning members participate;
displaying, by the processor, interactive data of each of a plurality of platooning members in the chat window in text form; and
displaying, by the processor, a text matched with each of the plurality of platooning members in the chat window,
wherein displaying on the chat window includes:
receiving, from a following vehicle among the platooning vehicles, a request to depart from a platooning line,
approving, by a leading vehicle among the platooning vehicles, departure of the following vehicle from the platooning line,
removing the following vehicle in a chat window displayed in the platooning vehicles when the following vehicle departs the platooning line; and
modifying and displaying positions of remaining platooning vehicles changed due to the following vehicle departing the platooning line.

14. The platooning management method of claim 13, wherein automatically converting the platooning state into the text includes:
determining the platooning state based on at least one of a platoon input switch signal, a platooning mode signal, a platooning path, a forward vehicle driving condition, or a road and environment condition.

15. The platooning management method of claim 13, wherein receiving the platoon chat from the user includes:
receiving text; or
converting a voice input from the user into a text.

16. The platooning management method of claim 13, wherein displaying on the chat window includes:
displaying the text on the chat window in a platoon chat time sequence or based on a platoon chat entity.

17. The platooning management method of claim 13, wherein displaying on the chat window includes:
displaying platoon chat entities on the chat window in the order of a platooning line.

18. The platooning management method of claim 13, wherein displaying on the chat window includes:
displaying a text input from a host vehicle and a text input from another vehicle on the chat window to differently distinguish at least one of a color, a size, a thickness, a font, or a display location.

19. The platooning management method of claim 13, wherein displaying on the chat window includes:

displaying a text indicating the platooning state and a text of chat contents input by the user on the chat window to differently distinguish at least one of a color, a size, a thickness, a font, or a display location.

* * * * *